United States Patent
Bai et al.

(10) Patent No.: US 11,277,756 B2
(45) Date of Patent: Mar. 15, 2022

(54) TRANSMISSION OF AGGREGATED SLOTS VIA MULTIPLE BEAMFORMED CHANNELS

(71) Applicant: QUALCOMM Incorporated, San Diego, CA (US)

(72) Inventors: Tianyang Bai, Bridgewater, NJ (US); Makesh Pravin John Wilson, San Diego, CA (US); Kiran Venugopal, Raritan, NJ (US); Tao Luo, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/376,860

(22) Filed: Apr. 5, 2019

(65) Prior Publication Data
US 2019/0373486 A1    Dec. 5, 2019

Related U.S. Application Data
(60) Provisional application No. 62/679,714, filed on Jun. 1, 2018.

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0617* (2013.01); *H04L 1/0009* (2013.01); *H04L 1/08* (2013.01); *H04W 88/08* (2013.01)

(58) Field of Classification Search
CPC . H04W 16/28; H04W 88/08; H04W 28/0273; H04W 4/80; H04B 7/0617; H04B 7/0408; H04B 7/0695; H04B 7/0626; H04L 1/0009; H04L 1/08; H04L 1/1819; H04L 1/0031; H04L 1/0003
See application file for complete search history.

(56) References Cited

U.S. PATENT DOCUMENTS

2016/0353424 A1* 12/2016 Stirling-Gallacher ...................... H04B 7/0626
2017/0054479 A1   2/2017 Sang et al.
(Continued)

FOREIGN PATENT DOCUMENTS

WO    2017083489 A1    5/2017
WO    2018075146 A1    4/2018

OTHER PUBLICATIONS

International Search Report and Written Opinion—PCT/US2019/026316—ISA/EPO—dated Jun. 19, 2019.

*Primary Examiner* — Vinncelas Louis
(74) *Attorney, Agent, or Firm* — Arent Fox LLP

(57) ABSTRACT

A base station (BS) can determine a beamforming configuration for communicating with a user equipment (UE) using aggregated slots or mini-slots, wherein the beamforming configuration can comprise multiple beamformed channels. The BS can then indicate, and the UE can identify, the beamforming configuration. The BS and the UE can then communicate with each other across the aggregated slots or mini-slots based on the beamforming configuration. Also, the BS and the UE can transmit and/or receive a transport block across the aggregated slots or mini-slots.

30 Claims, 15 Drawing Sheets

(51) Int. Cl.
  *H04L 1/00* (2006.01)
  *H04L 1/08* (2006.01)
  *H04W 88/08* (2009.01)

(56) References Cited

U.S. PATENT DOCUMENTS

| | | | |
|---|---|---|---|
| 2018/0103464 A1 | 4/2018 | John et al. | |
| 2018/0109358 A1 | 4/2018 | Xing et al. | |
| 2018/0294860 A1* | 10/2018 | Hakola | H04B 7/0695 |
| 2018/0343646 A1* | 11/2018 | Chou | H04W 16/28 |
| 2019/0045390 A1* | 2/2019 | Davydov | H04W 28/0273 |
| 2019/0166527 A1* | 5/2019 | Oketani | H04B 7/0695 |
| 2019/0254120 A1* | 8/2019 | Zhang | H04W 4/80 |

\* cited by examiner

TRANSMISSION OF AGGREGATED SLOTS VIA MULTIPLE BEAMFORMED CHANNELS

CROSS REFERENCE TO RELATED APPLICATION(S)

This application claims the benefit of U.S. Provisional Application Ser. No. 62/679,714, entitled "TRANSMISSION OF AGGREGATED SLOTS VIA MULTIPLE BEAMFORMED CHANNELS" and filed on Jun. 1, 2018, which is expressly incorporated by reference herein in its entirety.

BACKGROUND

Technical Field

The present disclosure relates generally to communication systems, and more particularly, to methods and devices for communicating based on improved transmission configurations.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Communication between a base station and a user equipment (UE) can include different beamformed channels sent from the base station to the UE or vice versa. Beamformed channels may be sensitive to blocking. Presently, there exists a need to improve upon the communications regarding these beamformed channels by providing new and improved transmission configurations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communications, e.g., mmW wireless communication, base stations and UEs can transmit and/or receive a plurality of directional beams in order to facilitate communication between each other. Wireless communication systems can rely on directional beamforming to improve on a number of transmission characteristics, such as signal-to-noise ratio (SNR). Such directional beams may be sensitive to blocking. If an object blocks one or more beams, then the benefits of beamforming are reduced or negated. Aspects presented herein enable a reduction in the effects of blocking through transmission on multiple beams. Additionally, transmission intervals, such as slots or mini-slots, can be aggregated to improve the coverage of the communications. By combining the concepts of multiple beam transmissions and aggregated transmission intervals, the overall reliability and coverage of a wireless communication system can be improved.

In an aspect of the disclosure, a method, a computer-readable medium, and an apparatus are provided for wireless communication. The apparatus can determine a beamforming configuration for communicating with a UE using aggregated transmission intervals. The beamforming configuration can comprise multiple beamformed channels. The apparatus can also indicate the beamforming configuration to the UE. Further, the apparatus can communicate with the UE across the aggregated transmission intervals based on the beamforming configuration. The apparatus can also signal a RV for the aggregated transmission intervals. The aggregated transmission intervals can comprise aggregated slots or aggregated mini-slots. Also, the beamforming configuration can comprise multiple spatial filters.

In another aspect of the disclosure, a method, a computer-readable medium, and an apparatus are provided for wireless communication. The apparatus can receive an indication of a beamforming configuration from a base station for communicating using aggregated transmission intervals. The beamforming configuration can comprise multiple beamformed channels. The apparatus can also identify the beamforming configuration based on the indication. Additionally, the apparatus can communicate with the base station across the aggregated transmission intervals based on the beamforming configuration. The apparatus can also identify a RV for the aggregated transmission intervals, wherein identifying the RV can be partly based on receiving a signal. The aggregated transmission intervals can comprise aggregated slots or aggregated mini-slots. Moreover, the beamforming configuration can comprise multiple spatial filters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
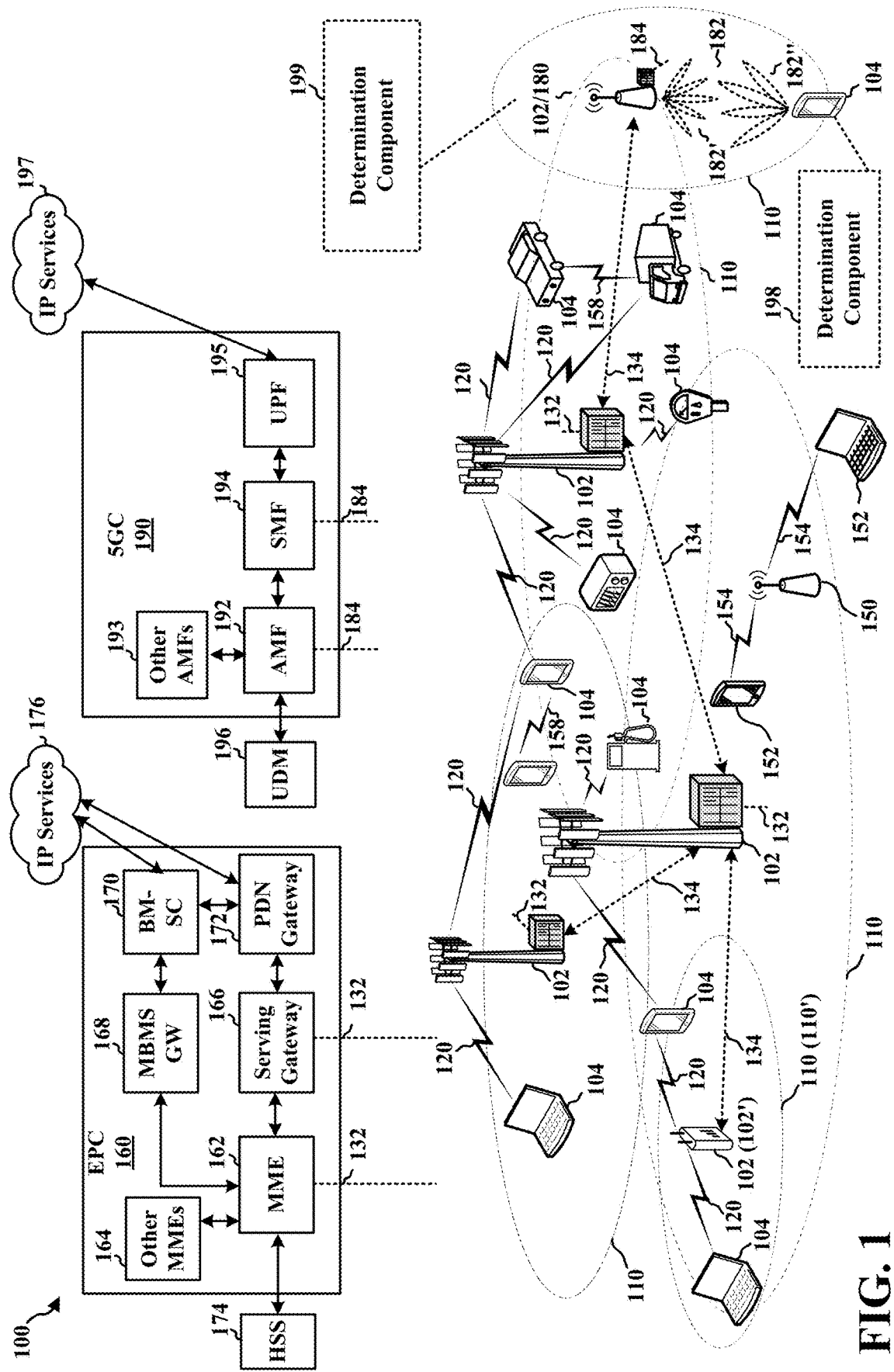
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a core network 190 (e.g., a 5GC). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ES S), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, UE 104 may include a determination component 198 configured to receive an indication of a beamforming configuration from a base station for communicating using aggregated transmission intervals. In some aspects, the beamforming configuration may comprise multiple beamformed channels. The determination component 198 may also be configured to identify the beamforming configuration based on the indication. Moreover, the determination component 198 may be configured to communicate with the base station across the aggregated transmission intervals based on the beamforming configuration. Additionally, the base station 102/180 may include a determination component 199 configured to determine a beamforming configuration for communicating with a UE using aggregated transmission intervals. In some aspects, the beamforming configuration may comprise multiple beamformed channels. The determination component 199 may also be configured to indicate the beamforming configuration to the UE. Further, the determination component 199 may be configured to communicate with the UE across the aggregated transmission intervals based on the beamforming configuration.

Figure 2:
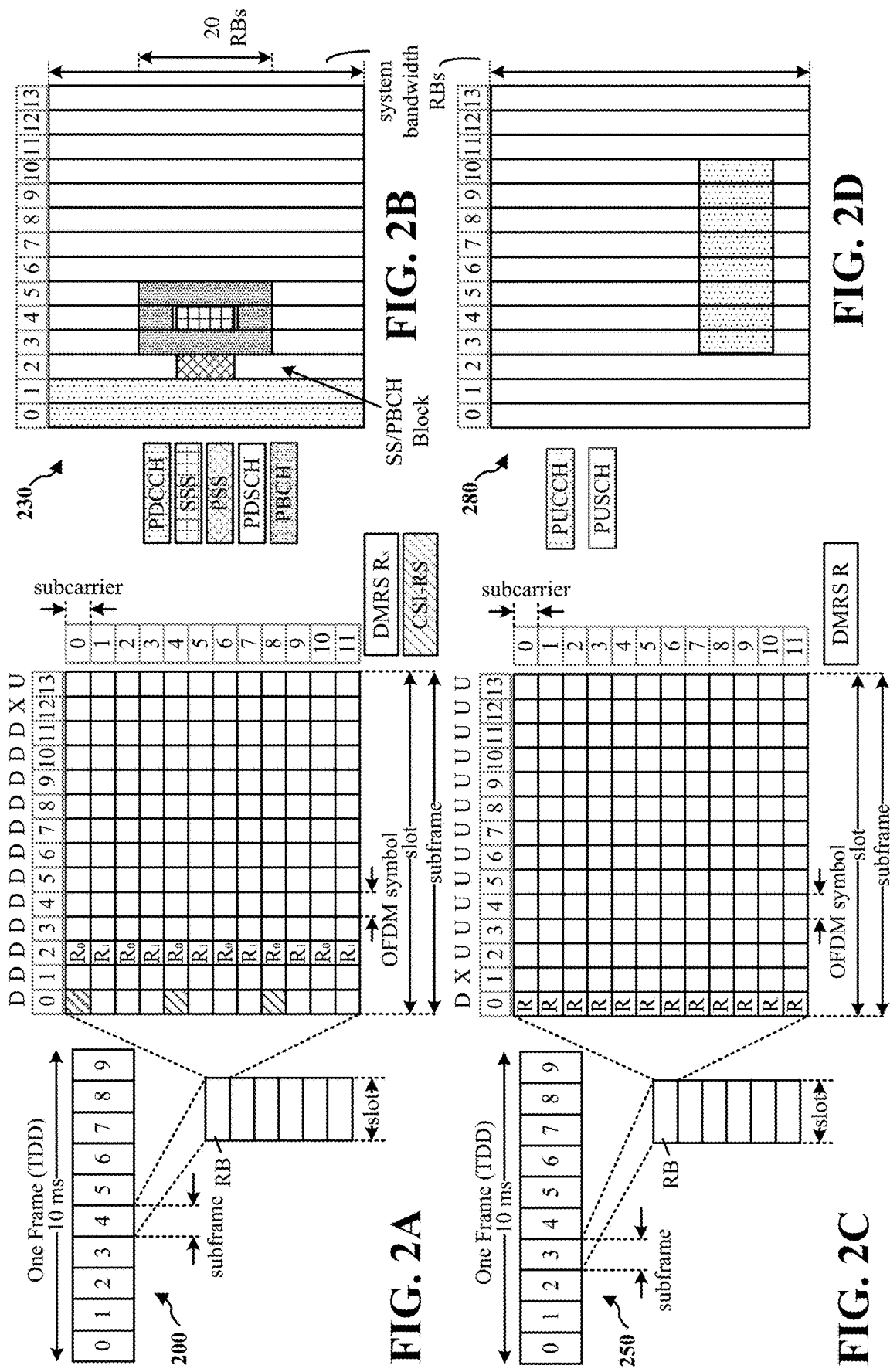
FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
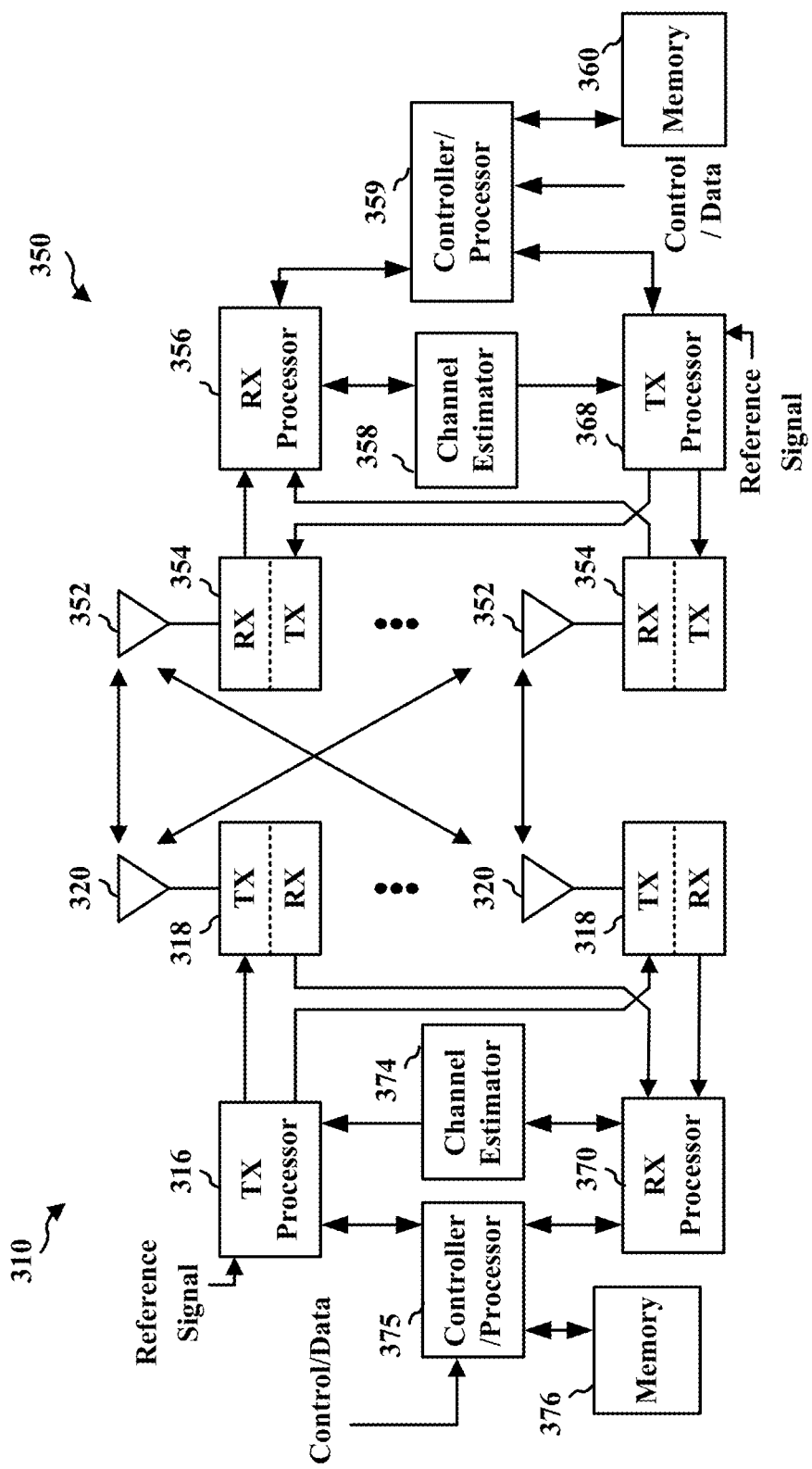
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
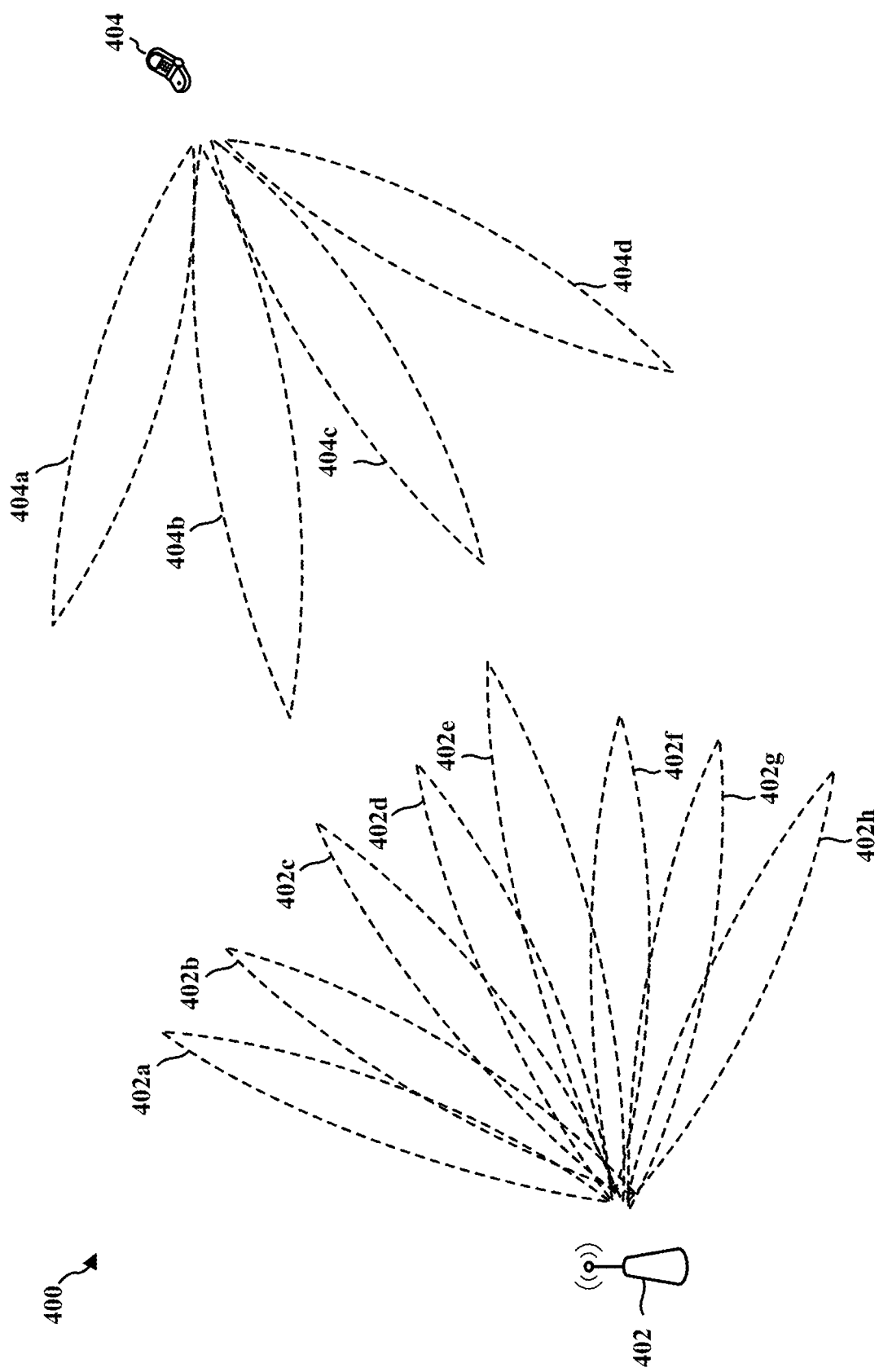
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5B:
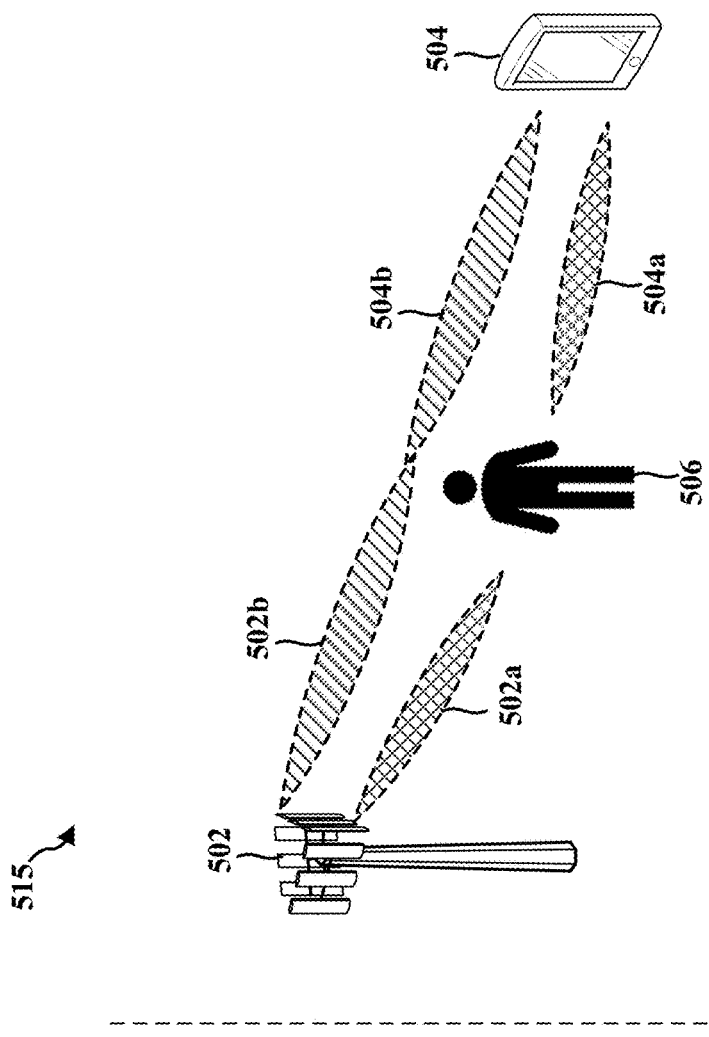
FIG. 5B illustrates a wireless communication system in accordance with certain aspects of the present disclosure.
Figure 5A:
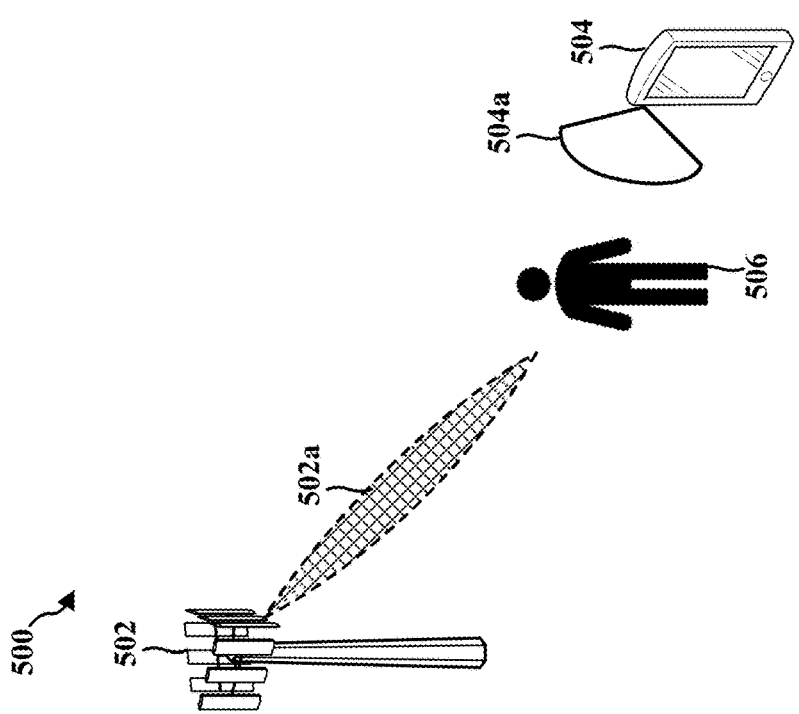
FIG. 5A illustrates a wireless communication system in accordance with certain aspects of the present disclosure.

FIG. 5A illustrates a wireless communication system 500 in accordance with certain aspects of the present disclosure. The wireless communication system 500 can include a base station 502 and a UE 504. The base station can correspond to, e.g., base station 102, 180, 310, 402, 804, apparatus 1102/1102'. The UE may correspond to, e.g., UE 104, 350, 404, 802, apparatus 1402/1402'.

An NR communication system (e.g., a mmW communication system) may use directional beamforming to increase the SNR of signals transmitted between the base station 502 and the UE 504. One potential drawback from using directional beamforming, for example, when using mmW frequencies, is that a beamformed channel may be sensitive to dynamic blocking.

For example, an object that did not obstruct the beamformed direction (e.g., direction 502a and direction 504a) at one position of user 506 may obstruct the beamformed direction at another position of user 506. Further, when the user's 506 fingers block one or more of the subarrays located at the UE 504, the beamformed direction between the base station 502 and the UE 504 may also be obstructed. In addition, when the user 506 rotates the UE 504, the polarization between base station 502 and the UE 504 may be mismatched. When the beamformed direction between the base station 502 and the UE 504 is obstructed or when the polarization is mismatched, the SNR of signal transmissions may be reduced, which lowers the QoS experienced by the user 506.

FIG. 5B illustrates a wireless communication system 515 in accordance with certain aspects of the present disclosure. The wireless communication system 515 may include a base station 502 and a UE 504. The base station may correspond to, e.g., base station 102, 180, 310, 402, 804, apparatus 1102/1102'. The UE may correspond to, e.g., UE 104, 350, 404, 802, apparatus 1402/1402'.

As seen in FIG. 5B, the first beamformed direction 502a, 504a can be blocked by the user 506, and hence, transmissions sent in the first beamformed direction 502a, 504a may have a reduced SNR as compared to when the first beamformed direction 502a, 504a is unblocked. However, the second beamformed direction 502b, 504b may be unblocked, and hence, may provide an increased SNR as compared to the first beamformed direction 502a, 504a. Accordingly, FIG. 5B illustrates that multi-beam transmission aids the wireless communication when at least one beam is blocked, especially since beam blocking may contribute to a reduction in SNR. Indeed, transmitting on multiple beams can provide transmission robustness to reduce the effects of beam blocking, thereby improving the overall transmit diversity or macro-diversity.

In wireless communication systems, e.g., a mmW communication system, in order to improve beam coverage, the concept of aggregated slots or mini-slots can be utilized. For instance, multiple transmission intervals, such as slots or mini-slots, can be aggregated using the same TCI beam. In an example, all of the transmission intervals can be aggregated using the same TCI beam. With such aggregation of multiple slots/mini-slots, the slots or mini-slots can appear to be a repetition of the first slot or mini-slot, with the same payload being transmitted in each slot or mini-slot and each slot or mini-slot being limited to sharing the same modulation and coding scheme (MCS). In one aspect, a signaling can be transmitted by the base station to the UE to indicate that the slots or mini-slots are aggregated. For instance, the UE can receive slots or multiple slots or mini-slots, and higher layer signaling can inform the UE that the slots or mini-are aggregated to improve the beam coverage. For example, when a number of slots or mini-slots are transmitted, the same information can be transmitted in each of those slots or mini-slots.

Additionally, the same TB can be transmitted in each of the aggregated slots or mini-slots, such that UE can soft combine across those slots or mini-slots for better decoding. As such, the UE can combine across each slot or mini-slot to in order to improve the decoding rate. In some aspects, the same payload information can be repeated across all of the slots or mini-slots. In other aspects, different RVs of the same payloads may be used. In some aspects, the payload information corresponding to modulated symbols may not be the same in the aggregated slots or mini-slots. For instance, different aggregated slots or mini-slots may correspond to different redundant versions of a TB. In further aspects, there may be non-identical payloads in different aggregated slots or mini-slots, e.g., where the basic graph (BG) of the channel coding can be different.

Some wireless communication systems may only consider using the same TCI state, e.g., beam configuration, for all aggregated slots or mini-slots. Hence, all the aggregated slots or mini-slots can be transmitted using one beam path or beamforming channel. All slots or mini-slots can be expected to use the same MCS, as well as have the same RE allocation. Further, the transport block size (TBS) or BG can be the same for all slots or mini-slots. Indeed, because the slots or mini-slots are basically repetitions of one another, each slot or mini-slot can each have the same TBS. The BG is a property of low-density parity-check (LDPC) code, which is a linear error correcting code used in wireless communications. Different BGs are generated by different types of matrices. Wireless communication systems can use a variety of different BGs, e.g., two BGs. Moreover, the determination of a BG is similar to the determination of a TBS.

As stated above, communications via directions beams in mmW systems may be fragile due to the concept of dynamic blocking. Hence, transmitting all of the aggregated slots or mini-slots via a single beam may not provide protection against blocking. Therefore, the present disclosure provides the concept of aggregated slots or mini-slots using multiple beams or beamformed channels. By using different TCI beams for aggregated slots or mini-slots, the wireless communication system can gain macro-diversity against the concept of beam blocking.

Communication rules can be specified for aggregated slots or mini-slots that are transmitted via different beams. For instance, as different TCI beams may have different path losses or SNRs, more flexible beamforming configurations may enable transmissions on different beams. Also, more flexible beamforming configurations may allow the aggregated slots or mini-slots to comprise different MCSs. Further, if different MCSs are allowed, then new flexible communication rules may be applied to determine the TBS or BG for the aggregated slots or mini-slots. For example, the wireless communication system can use different MCSs or RVs for slots or mini-slots on different beams or beamformed channels. However, a same TBS and BG may be maintained for each slot or mini-slot, even though the MCS for each slot or mini-slot can be different.

When aggregating slots or mini-slots via multiple beams in a wireless communication system, the base station and the UE can comprise a number of functions. Regarding the base station, it can determine a beamforming configuration for transmitting aggregated slots or mini-slots using multiple beamformed channels. The base station can also signal to the UE to indicate at least a part of the information regarding the beamforming configuration. Additionally, the base station can send the TCI to inform the UE regarding at least a portion of the configuration. The base station can also transmit and/or receive the aggregated slots or mini-slots based on the beamforming configuration. The base station can use a transmitter or receiver based on whether the transmission is downlink or uplink, respectively.

Each of the aggregated slots or mini-slots may contain encoded bits corresponding to the same TB. For instance, the bits in each slot or mini-slot may be different, but the bits can still correspond to the same TB. As indicated herein, the same TBS or BG (e.g., for LDPC channel code) can be used for all slots or mini-slots.

Any of a number of ways may be used to determine the size of the TB or the BG. In one aspect, the TBS or BG can be determined based on one specified slot configuration. Further, the TBS or BG can be determined based on MCS of the specified slot, no matter where the slot is located. For example, the specified slot can be identified based on an MCS, e.g., the lowest MCS slot, wherein the MCS value of the lower MCS slot determines the TBS or BG. In another example, the specified slot may be based on a position of the slot, e.g., the first slot wherein the MCS value of the first MCS slot determines the TBS or BG. Additionally, the TBS or BG can be determined based on the number of REs in the slot. For example, the number of REs in the first slot can be used. In some aspects, certain overhead REs can be excluded from this calculation. As such, wireless communication systems according to the present disclosure can use the MCS to determine how many encoded bits should be encoded in each of the REs, as well as how many REs are in each slot. Moreover, the TBS or BG can be determined based on the parameters from multiple slots or mini-slots. In addition, the TBS or BG can be calculated based on the total number of REs in all the slots or mini-slots.

The beamforming configuration can be signaled or indicated from the base station to the UE, or vice versa. As noted above, this signal or indication can specify the MCS for each of the aggregated slots or mini-slots. This signaling or indicating can be a combination of at least one of DCI, RRC, or MAC-CE. However, a number of other types of signaling may also be used. As different beamformed channels can be used in aggregating the slots or mini-slots, the different beamformed channels can correspond to different TCI states or beams.

Different slots or mini-slots may be allowed to have different MCS or modulation orders, based on the SNR. As such, the beamforming configuration can specify different slots or mini-slots. For example, the TCI can specify which slot or mini-slot corresponds to a particular MCS. As an example, slot 1 may correspond to MCS 0; slot 2 may correspond to MCS 1; and slot 3 may correspond to MCS 2. However, different slots can correspond to a number of different MCS values.

There are also a variety of different ways the beamforming configuration can be transmitted. For instance, a spatial filter can be used to transmit or receive the aggregated slots or mini-slots. Because different beams are used for different slots or mini-slots, the wireless communication system can use a spatial filter to transmit and/or receive each of the slots or mini-slots. Indeed, spatial filters according to the present disclosure can be used with either downlink or uplink transmission. In some aspects, a spatial filter can correspond to a beamforming configuration communicating in each of the slots or mini-slots. In order to form a particular beamformed channel, spatial filters can be selected and applied for both transmissions and receptions. Further, different spatial filters may be used for different beamformed channels. However, the base station may inform the UE of which spatial filter it prefers for each of the beamformed channels in the aggregated slots or mini-slots. Therefore, the UE can prepare the transmission or reception spatial filters at the UE side according to the communication.

Figure 6:
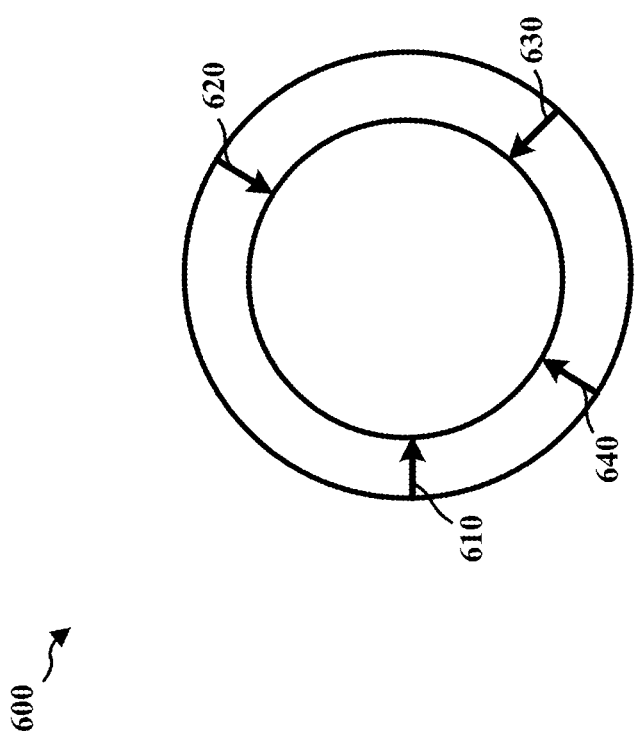
FIG. 6 illustrates a circular buffer in accordance with certain aspects of the present disclosure.
Figure 7:
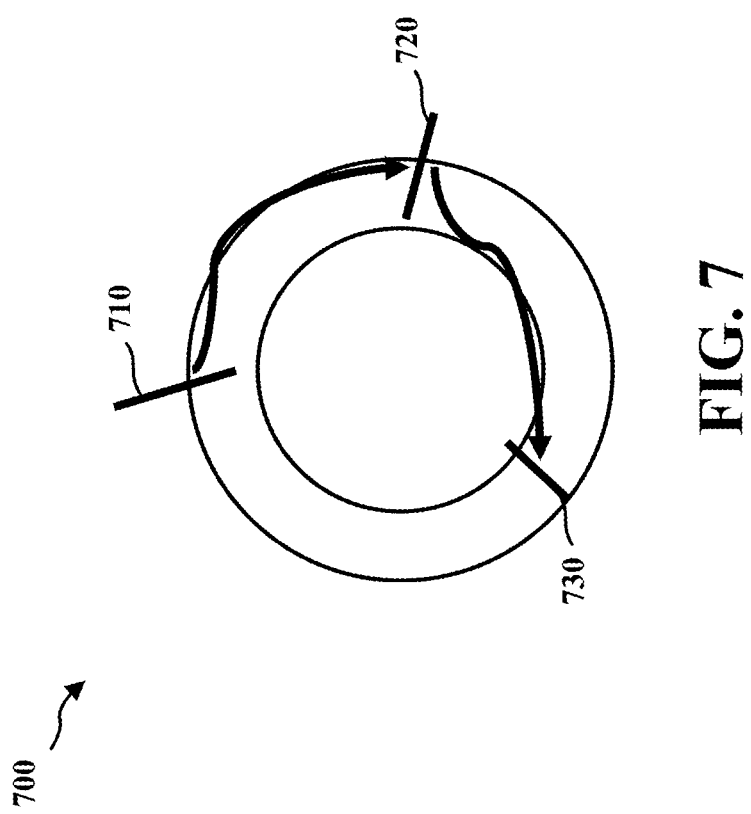
FIG. 7 illustrates a circular buffer in accordance with certain aspects of the present disclosure.

Additionally, different slots or mini-slots may be mapped with different RVs of encoded bits from a circular buffer. FIGS. 6 and 7 displays example uses of circular buffers. In some aspects, the outcome of channel coding may contain more bits than is preferred to send in a single slot or mini-slot. By placing the encoded bits in a circular buffer, and then specifying the contact location, the wireless system can start reading the bits at that contact location.

FIG. 6 displays one example of a circular buffer 600. As shown in FIG. 6, circular buffer 600 includes RV 610, RV, 620, RV, 630, and RV 640. As further displayed in FIG. 6, each slot or mini-slot starts to read the bits from a predefined location in circular buffer 600, e.g., regardless where the previous slot ends. This can also be referred to as an RV sequence. As the RV for different slots within the aggregated slots or mini-slots may differ, an RV sequence for all slots may be specified by signaling. For instance, a first signaling may provide a list of candidate RV sequences, a second signaling can select one candidate RV sequence. E.g., the first signaling can indicate a list of RV patterns. For example, a first RV pattern in the list for an aggregation of three slots may comprise RV1, e.g., RV 620, RV1, e.g., RV 620, RV1, e.g., RV 620. A second RV pattern in the list may comprise RV2, e.g., RV 630, RV1, e.g., RV 620, RV3, e.g., RV 640. Table 1 illustrates an example of a list of two RV sequences that may be indicated in the first signaling. Then, the second signaling can indicate one of the RV sequences from among the list provided in the first signaling. For example, the second signaling may indicate RV sequence 2, which the UE will know corresponds to RV2, RV1, RV3 based on the list provided in the first signaling. In this manner, the first signaling displays a fixed table or list of RV sequences, and the second signaling indicates which RV sequence from the list should be applied. Accordingly, the start of each subsequent slot may be fixed based on the corresponding RV for the slot, and might not depend on the previous slot selection or where on the circular buffer the bits of the previous slot end.

TABLE 1

|  | Slot 1 | Slot 2 | Slot 3 |
| --- | --- | --- | --- |
| RV sequence 1 | RV1 | RV1 | RV1 |
| RV sequence 2 | RV2 | RV1 | RV3 |

FIG. 7 displays another example of a circular buffer 700 in which the bits of the first slot, e.g., first slot 710, correspond to a predefined location on the circular buffer, e.g., according to an RV. The position on the circular buffer of the bits for subsequent slots, e.g., second slot 720 and third slot 730, may be based on where the bits of previous slot end in the circular buffer 700. In this example, the wireless system may only define an RV for one common beginning slot, and the subsequent slots may continue where the bits of the previous slot end on the circular buffer.

The functions of the UE can be similar to or different from their corresponding base station side functions. For instance, the UE can receive a signaling that indicates information about a beamforming configuration, wherein the configuration can comprise transmitting aggregated slots or mini-slots using different beamformed channels. In this instance, the UE can receive a TCI from the base station. The UE can also identify the configuration at least partly based on the aforementioned received signaling. Additionally, the UE can transmit or receive the aggregated slots/mini-slots based on the beamforming configuration.

As described in connection with a base station, each of the aggregated slots or mini-slots for a UE may contain encoded bits corresponding to the same TB. For example, the bits in each slot or mini-slot may be different, but the bits can still correspond to the same TB. As indicated above, the same TBS or BG, or LDPC channel code, can be used for all slots or mini-slots. Like the base station side, there are a number of ways to determine the size of the TB or BG. In one aspect, the TBS or BG can be determined based on one specified slot configuration. For example, the specified slot can be the lowest MCS slot or the first slot. However, the TBS or BG can be determined based on MCS of the specified slot, no matter where the slot is located. Further, the TBS or BG can be determined based on the number of REs in the slot, wherein certain overhead REs can be excluded from this calculation. Moreover, the TBS or BG can be determined based on the parameters from multiple slots or mini-slots, as well as based on the total number of REs in all the slots or mini-slots.

As noted above, the beamforming configuration can be signaled or indicated from the UE to the base station, or vice versa. This signal or indication can specify the MCS for each of the aggregated slots or mini-slots. This signaling or indicating can also be a combination of at least one of DCI, RRC, or MAC-CE. In addition, the different beamformed channels can correspond to different TCI states or beams.

As with the base station, there may also be a variety of different ways the beamforming configuration can be transmitted. For instance, the UE can identify the transmission based on the TCI. A spatial filter can receive or transmit the aggregated slots/mini-slots based on whether the transmission is uplink or downlink. Different slots/mini-slots may also be allowed to have different MCS or modulation orders based on the SNR. As mentioned above, different slots/mini-slots may also be mapped with different versions of the encoded bits from a circular buffer. In one aspect, as indicated in FIG. 6 herein, each slot can starts to read the bits from a predefined location in the circular buffer, also referred to as the RV sequence. This RV sequence can be signaled for all slots/mini-slots. In this example, a first signaling can provide a list of candidate RV sequences, while a second signaling can down-select single candidate RV sequence. In another aspect, as indicated in FIG. 7, a first slot can read from a predefined location, and all subsequent slots can read from where the previous slot ends.

Figure 8:
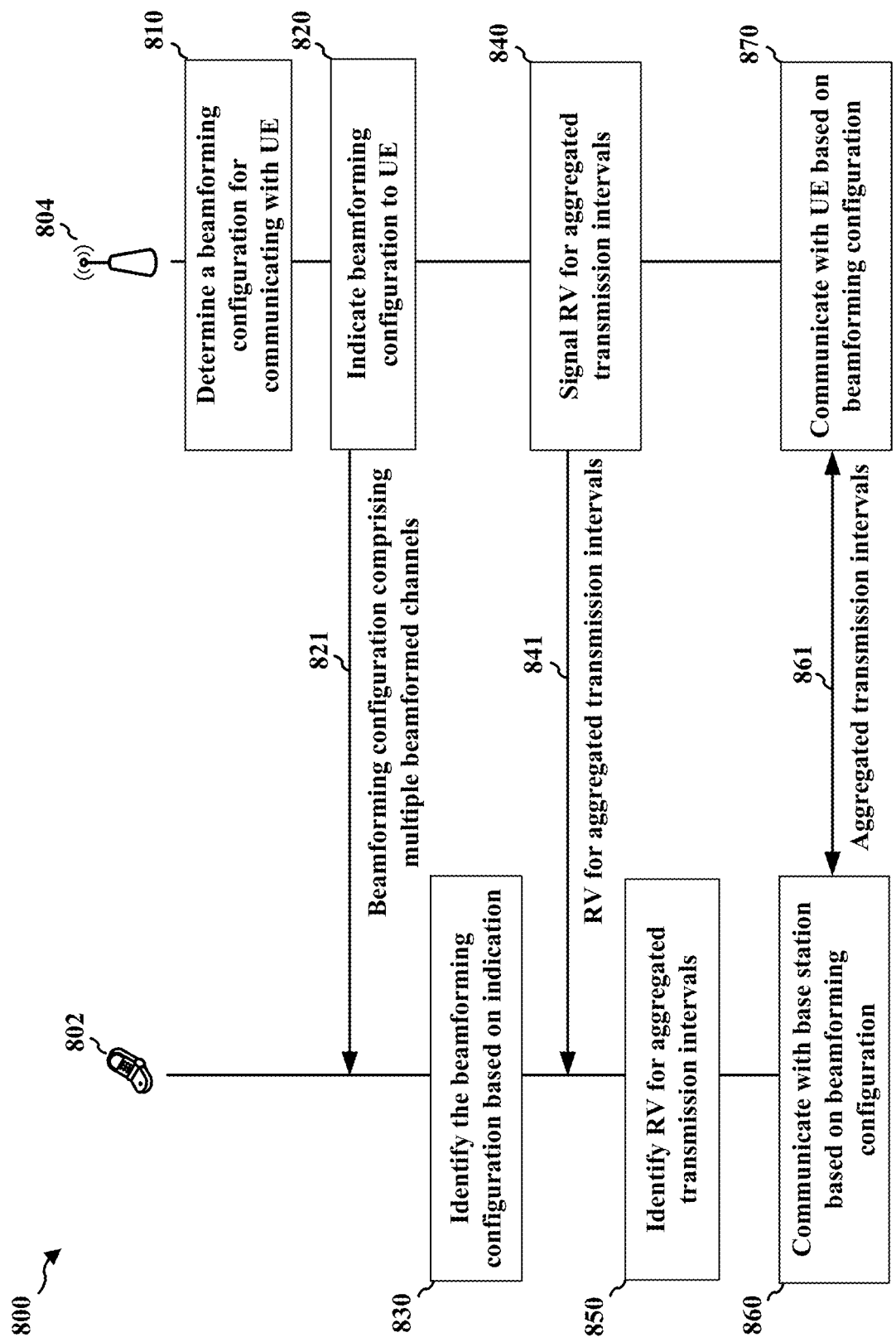
FIG. 8 is a diagram illustrating transmissions between a base station and a UE.

FIG. 8 is a diagram 800 illustrating transmissions between base station 804 and UE 802 including multiple beams. For instance, base station 804 can determine 810 a beamforming configuration for communicating with UE 802 using aggregated transmission intervals, e.g., aggregated slots or mini-slots. This beamforming configuration can comprise multiple beamformed channels, as shown in 821. Base station 804 can then indicate 820 the beamforming configuration to UE 802. UE 802 can also identify 830 the beamforming configuration based on indication from base station 804. Next, base station 804 can signal 840 a RV for aggregated transmission intervals, as shown in 841. UE 802 can also identify 850 the RV for the aggregated transmission intervals. Additionally, UE 802 can communicate 860 with base station 804 based on the beamforming configuration across the aggregated transmission intervals 861. Base station 804 can also communicate 870 with UE 802 based on the beamforming configuration across the aggregated transmission intervals 861.

Figure 9:
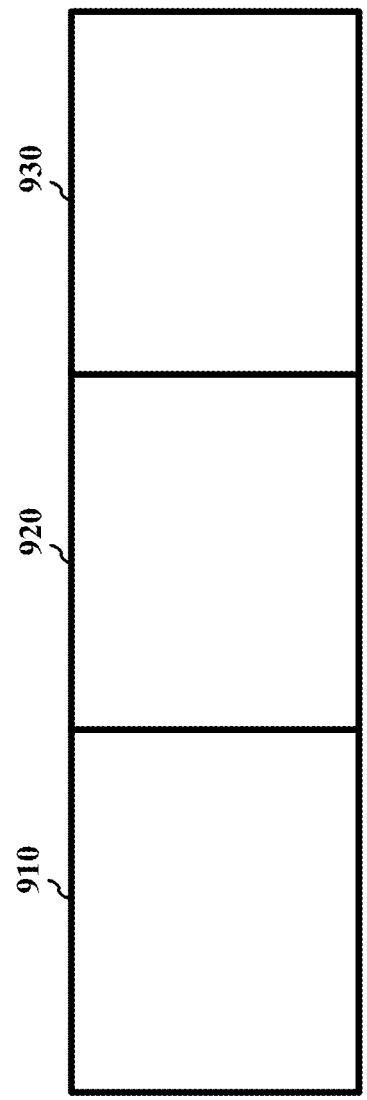
FIG. 9 illustrates multiple slots in accordance with certain aspects of the present disclosure.

As described above, the wireless communication system may aggregate different slots or mini-slots transmitted using beams corresponding to different TCI states, including different MCS. FIG. 9 displays one example of a slot aggregation 900. As shown in FIG. 9, the different slots can be allocated according to SNR value. For instance, slots 910, 920, 930 may comprise aggregated slots/mini-slots sent using beams corresponding to different TCI states. Slot 910 may comprise the best SNR and therefore be transmitted having an MCS of 64 quadrature amplitude modulation (QAM). Slot 920 may comprise the next highest SNR and may be transmitted having an MCS of 16 QAM. Also, slot 930 may comprise the worst SNR and may be transmitted having an MCS of QPSK. Thus, the different MCS for the aggregated slots/mini-slots may be selected based on different channel conditions for the respective slot/mini-slot. The different MCS values (e.g., 64 QAM, 16 QAM, QPSK) or modulation order may be specified for each slot and may be informed to the UE, e.g., by DCI.

In one example, the TBS or BG can be determined based on the MCS and RE allocation in one slot, for example slot 910 or slot 930. The coded bits of each slot may be based a circular buffer. As mentioned above, the starting location of the bits of each slot can be defined in a RV sequence. The RV sequence can be indicated by a DCI or MAC-CE signaling. The signaling may comprise a first signaling indicating a list of RV sequences and a second signaling indicating the selected RV sequence from among a list of RV sequences. The list of RV sequences can be signaled by RRC.

In another example, the TBS or BG can be determined based on the lowest MCS or the total RE number in all slots, minus any overhead REs. As described above, the coded bits of each slot can be taken from a circular buffer, wherein the starting location of the n+1 slot follows the ending location of n-th slot. If LDPC is used, the TBS or BG can be determined in a similar manner to either in examples above. In the examples above, the same TBS or BG (used for LDPC code) can be used for each slot or mini-slot.

Figure 10:
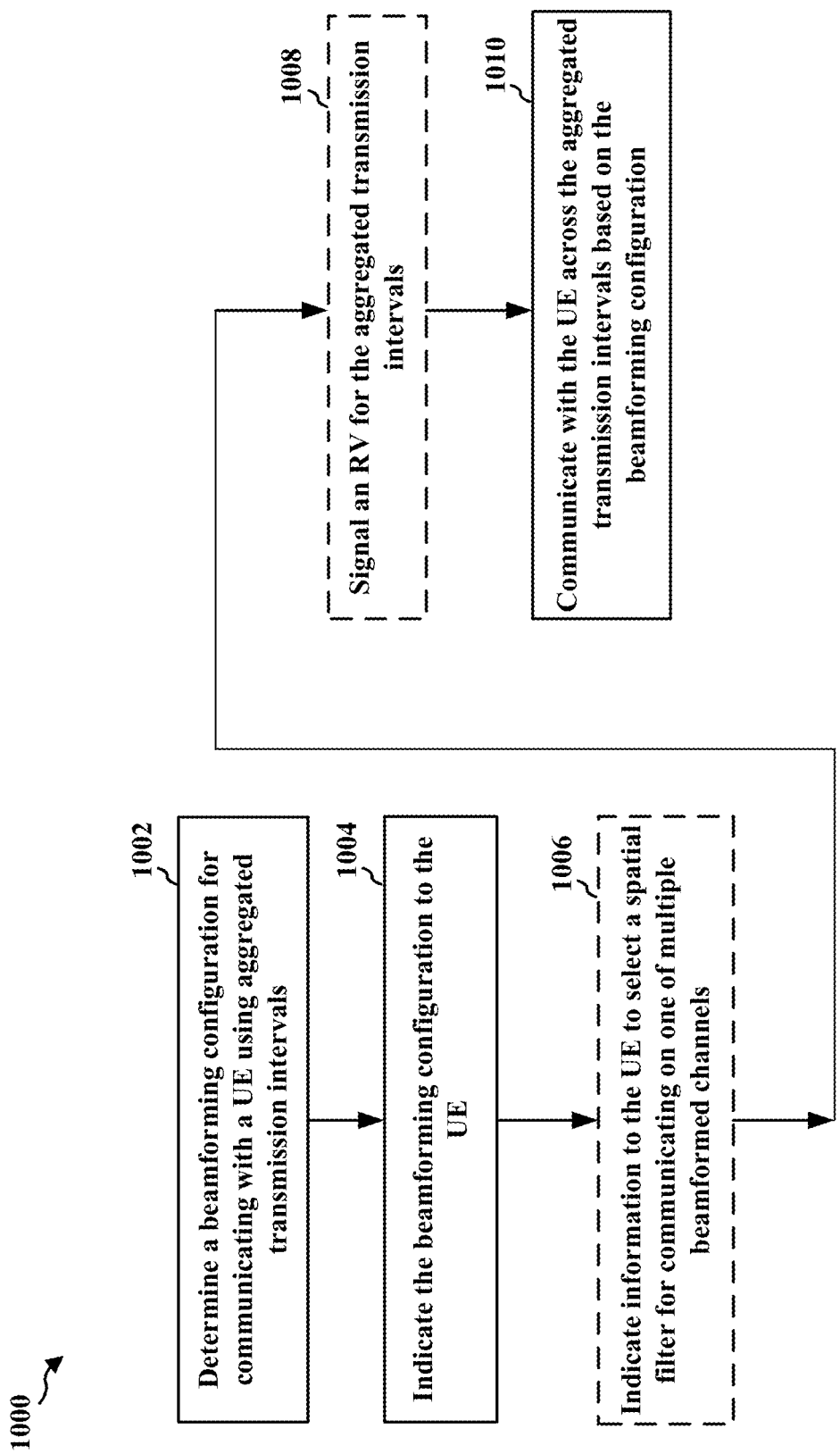
FIG. 10 is a flowchart of a method of wireless communication.

FIG. 10 is a flowchart 1000 of a method of wireless communication. The method may be performed by a base station (e.g., base station 102, 180, 310, 402, 804; apparatus 1102/1102'; the processing system 1214, which may include the memory 376 and which may be the entire base station or a component of the base station, such as the TX processor 316, the RX processor 370, and/or the controller/processor 375). Optional aspects are illustrated with a dashed line. The methods described herein can provide a number of benefits, such as improving power savings and resource utilization.

At 1002, the base station can determine a beamforming configuration for communicating with a UE using aggregated transmission intervals. The beamforming configuration can comprise multiple beamformed channels. Also, the aggregated transmission intervals can comprise aggregated slots or aggregated mini-slots. At 1004, the base station can indicate the beamforming configuration to the UE. The indicating the beamforming configuration to the UE can further comprise indicating information to the UE to select a spatial filter for communicating on one of the multiple beamformed channels, as shown at 1006. Each beamformed channel can comprise a different TCI state. The multiple beamformed channels can also comprise multiple MCSs, wherein the multiple MCSs can be indicated to the UE with the beamforming configuration. The beamforming configuration is can be indicated using at least one of DCI, RRC, or a MAC-CE. Moreover, the beamforming configuration can comprise multiple spatial filters.

Additionally, a payload for a TB can be communicated in each of the aggregated transmission intervals. In some aspects, the payload for the transport block can be repeated across all of the aggregated transmission intervals. Each of the aggregated transmission intervals can also comprise the same TBS. Further, the TBS or a BG for each of the aggregated transmission intervals can be determined based on a configuration of a specified slot of the aggregated transmission intervals. The specified slot can be selected based on an MCS of that specified slot, as well as based on a location of the specified slot within the aggregated transmission intervals. Moreover, the TBS or a BG for each of the aggregated transmission intervals can be based on an MCS of the specified slot and/or a number of REs in the specified slot. The TBS or a BG can also be determined based on one or more parameters of the aggregated transmission intervals, wherein the one or more parameters can comprise an amount of REs in the aggregated transmission intervals. Also, the TB can be communicated in each of the aggregated transmission intervals based on the same BG.

At 1008, the base station can signal a RV for the aggregated transmission intervals. The signaling the RV for the aggregated transmission intervals can include a first signaling comprising a list of candidate RV sequences and a second signaling indicating one candidate from among the list of candidate RV sequences. Additionally, the RV for the aggregated transmission intervals can indicate an RV for the first slot, and wherein a location on a circular buffer for the other transmission intervals of the aggregated transmission intervals is based on the location at which a prior slot ends.

Finally, at 1010, the base station can communicate with the UE across the aggregated transmission intervals based on the beamforming configuration. The communicating with the UE can comprise transmitting a TB to the UE across the aggregated transmission intervals, wherein the TB can be transmitted on a different beamformed channel in each of the aggregated transmission intervals. Also, communicating with the UE can comprise receiving a TB from the UE across the aggregated transmission intervals, wherein the TB can be received on a different beamformed channel in each of the aggregated transmission intervals.

Figure 11:
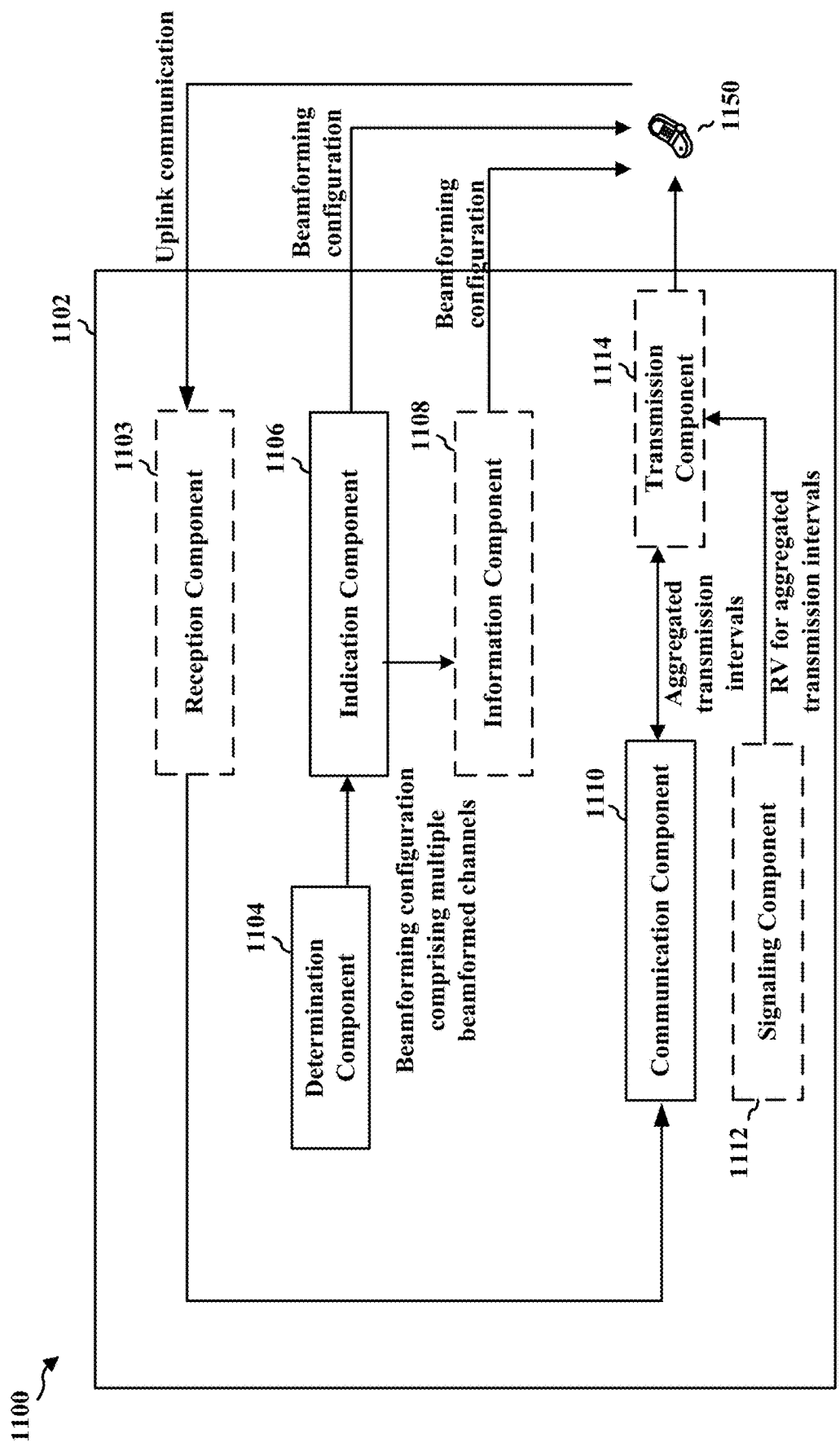
FIG. 11 is a conceptual data flow diagram illustrating the data flow between different means/components in an exemplary apparatus.

FIG. 11 is a conceptual data flow diagram 1100 illustrating the data flow between different modules/means/components in an exemplary apparatus 1102. The apparatus may be a base station (e.g., base station 102, 180, 310, 402, 804). The apparatus 1102 includes a determination component 1104 configured to determine a beamforming configuration for communicating with a UE using aggregated transmission intervals, wherein the beamforming configuration comprises multiple beamformed channels. The apparatus can also include an indication component 1106 configured to indicate the beamforming configuration to the UE.

Additionally, the apparatus can include an information component 1108 configured to indicate information to the UE to select a spatial filter for communicating on one of the multiple beamformed channels. The apparatus can further include a communication component 1110 configured to communicate with the UE across the aggregated transmission intervals based on the beamforming configuration, e.g., by receiving uplink communication via reception component 1103 or by transmitting downlink communication to the UE via a transmission component 1114. Also, a signaling component 1112 can be configured to signal a RV for the aggregated transmission intervals.

The apparatus may include additional components that perform each of the blocks of the algorithm in the aforementioned flowcharts of FIGS. 8 and 10. As such, each block in the aforementioned flowcharts of FIGS. 8 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
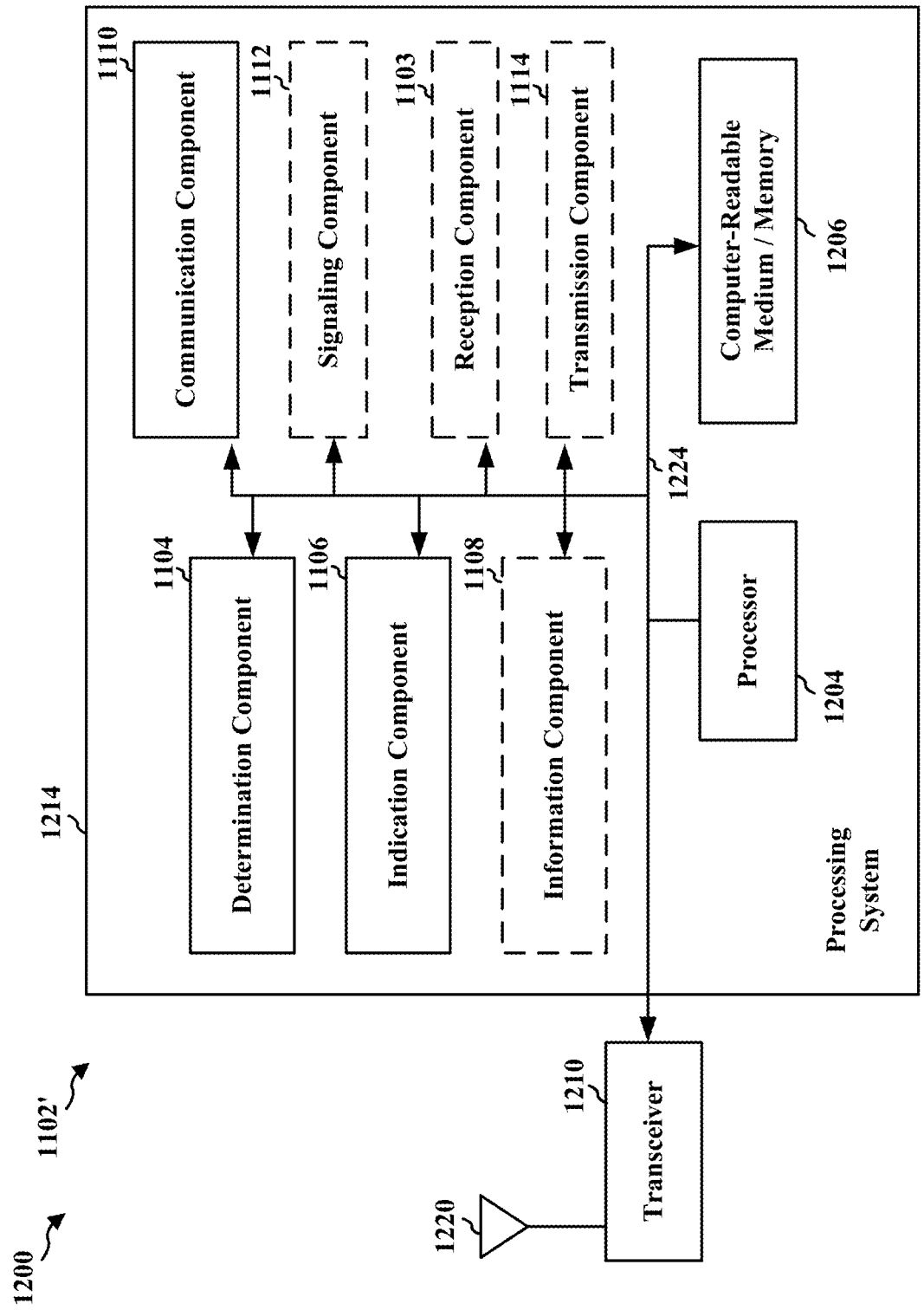
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1103, 1104, 1106, 1108, 1110, 1112, 1114, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1103. In addition, the transceiver 1210 receives information from the processing system 1214, specifically the transmission component 1114, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1103, 1104, 1106, 1108, 1110, 1112, and 1114. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3).

In one configuration, the apparatus 1102/1102' for wireless communication includes means for determining a beamforming configuration for communicating with a UE using aggregated transmission intervals, wherein the beamforming configuration comprises multiple beamformed channels; means for indicating the beamforming configuration to the UE; and means for communicating with the UE across the aggregated transmission intervals based on the beamforming configuration. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
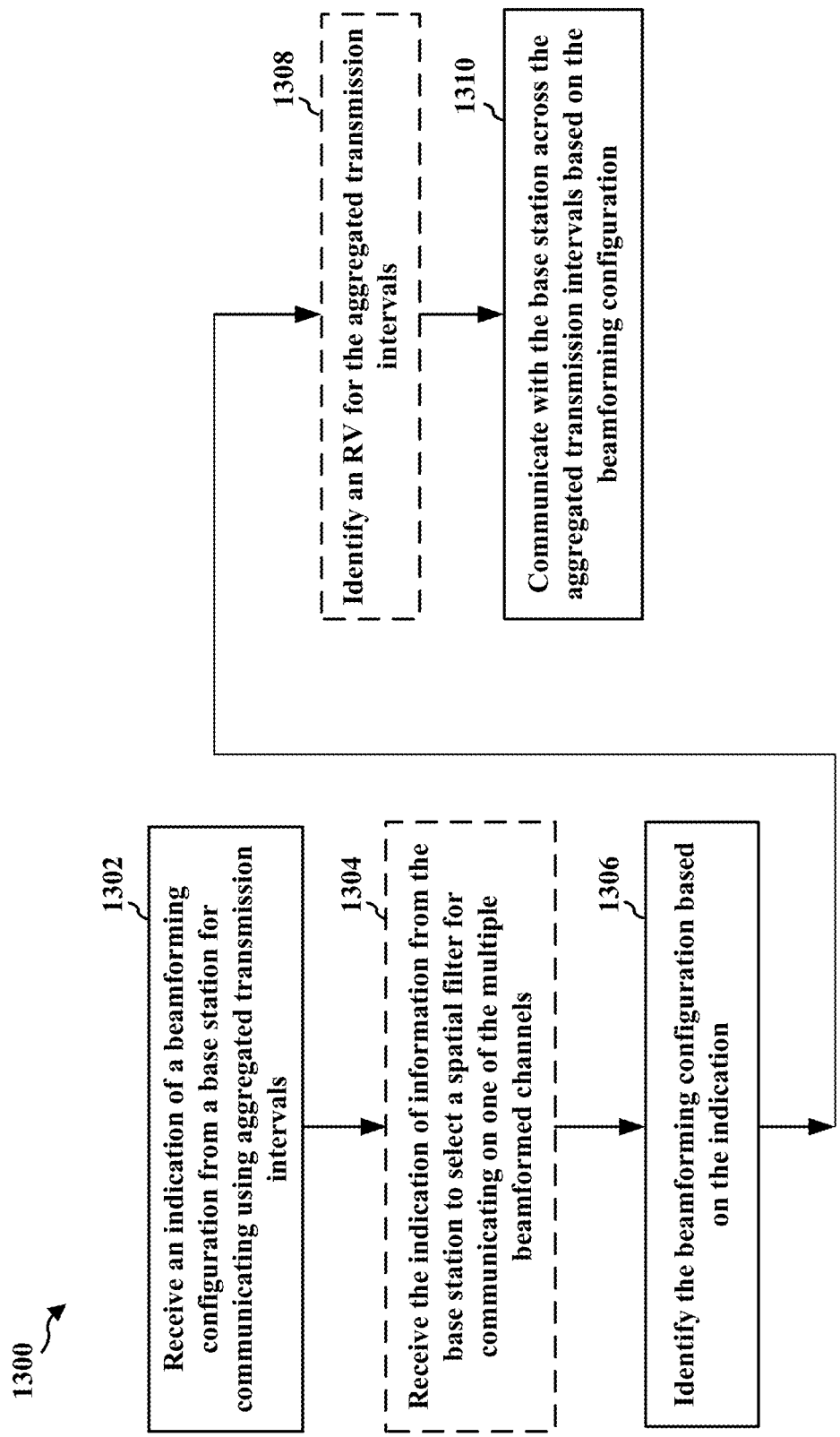
FIG. 13 is a flowchart of a method of wireless communication.

FIG. 13 is a flowchart 1300 of a method of wireless communication. The method may be performed by a UE (e.g., UE 104, 182, 350, 404, 802; apparatus 1402/1402'; the processing system 1514, which may include the memory 360 and which may be the entire UE or a component of the UE, such as the TX processor 368, the RX processor 356, and/or the controller/processor 359). Optional aspects are illustrated with a dashed line. The methods described herein can provide a number of benefits, such as improving power savings and resource utilization.

At 1302, the UE can receive an indication of a beamforming configuration from a base station for communicating using aggregated transmission intervals. The receiving the indication of the beamforming configuration from the base station can further comprise receiving the indication of information from the base station to select a spatial filter for communicating on one of the multiple beamformed channels, as shown at 1304. The beamforming configuration can comprise multiple beamformed channels. Also, the aggregated transmission intervals can comprise aggregated slots or aggregated mini-slots. At 1306, the UE can identify the beamforming configuration based on the indication. Each beamformed channel can comprise a different TCI state. The multiple beamformed channels can also comprise multiple MCSs, wherein the multiple MCSs can be indicated from the base station with the beamforming configuration. The indication of the beamforming configuration can comprise at least one of DCI, RRC, or a MAC-CE. Further, the beamforming configuration can comprise multiple spatial filters.

In addition, a payload for a TB can be communicated in each of the aggregated transmission intervals. In some aspects, the payload for the transport block can be repeated across all of the aggregated transmission intervals. Each of the aggregated transmission intervals can also comprise the same TBS. Moreover, the TBS or BG for each of the aggregated transmission intervals can be determined based on a configuration of a specified slot of the aggregated transmission intervals. The specified slot can be selected based on an MCS of that specified slot, as well as based on a location of the specified slot within the aggregated transmission intervals. Further, the TBS or BG for each of the aggregated transmission intervals can be based on an MCS of the specified slot and/or a number of REs in the specified slot. The TBS or BG can also be determined based on one or more parameters of the aggregated transmission intervals, wherein the one or more parameters can comprise an amount of REs in the aggregated transmission intervals. Also, the TB can be communicated in each of the aggregated transmission intervals based on the same BG.

At 1308, the UE can identify a RV for the aggregated transmission intervals. The identifying the RV for the aggregated transmission intervals can be at least partly based on receiving a signal. The signal for the aggregated transmission intervals can include a first signal comprising a list of candidate RV sequences and a second signal indicating one candidate from among the list of candidate RV sequences.

Additionally, the RV for the aggregated transmission intervals can indicate an RV for the first slot, and wherein a location on a circular buffer for the other transmission intervals of the aggregated transmission intervals can be based on the location at which a prior slot ends.

Finally, at 1310, the UE can communicate with the base station across the aggregated transmission intervals based on the beamforming configuration. The communicating with the base station can comprise receiving a TB from the base station across the aggregated transmission intervals, wherein the TB can be received on a different beamformed channel in each of the aggregated transmission intervals. Also, communicating with the base station can comprise transmitting a TB to the base station across the aggregated transmission intervals, wherein the TB can be transmitted on a different beamformed channel in each of the aggregated transmission intervals.

Figure 14:
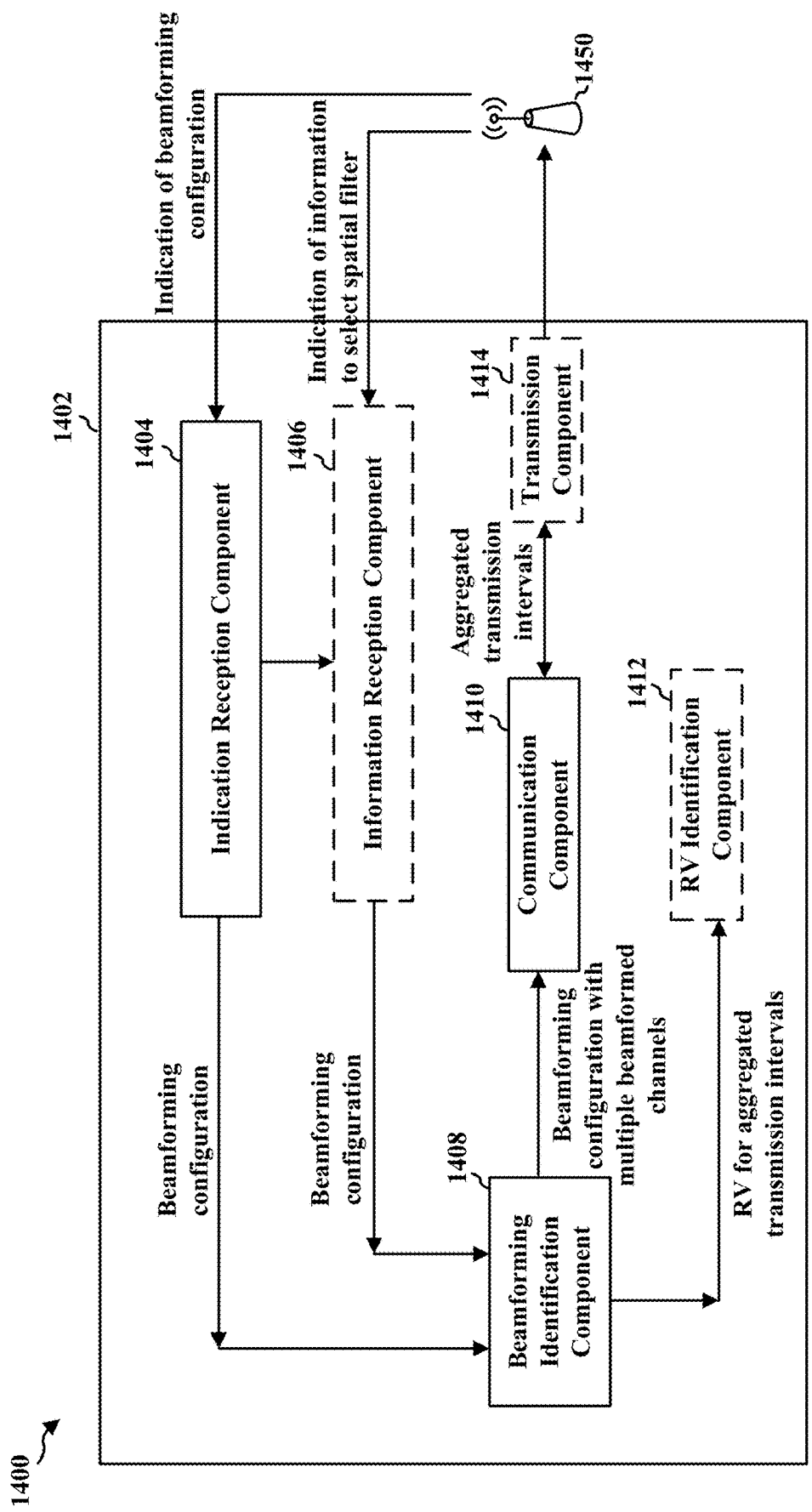
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a UE (e.g., UE 104, 182, 350, 404, 802). The apparatus 1402 includes an indication reception component 1404 configured to receive an indication of a beamforming configuration from a base station for communicating using aggregated transmission intervals, wherein the beamforming configuration comprises multiple beamformed channels. The apparatus can also include an information reception component 1406 configured to receive the indication of information from the base station to select a spatial filter for communicating on one of the multiple beamformed channels.

In addition, the apparatus can include a beamforming identification component 1408 configured to identify the beamforming configuration based on the indication. The apparatus can further include a communication component 1410 configured to communicate with the base station across the aggregated transmission intervals based on the beamforming configuration, e.g., by receiving uplink communication via indication reception component 1404 or information reception component 1406, or by transmitting downlink communication to the UE via a transmission component 1414. Moreover, an RV identification component 1412 can be configured to identify an RV for the aggregated transmission intervals.

The apparatus may include additional components that perform each of the blocks of the algorithm in the aforementioned flowcharts of FIGS. 8 and 13. As such, each block in the aforementioned flowcharts of FIGS. 8 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
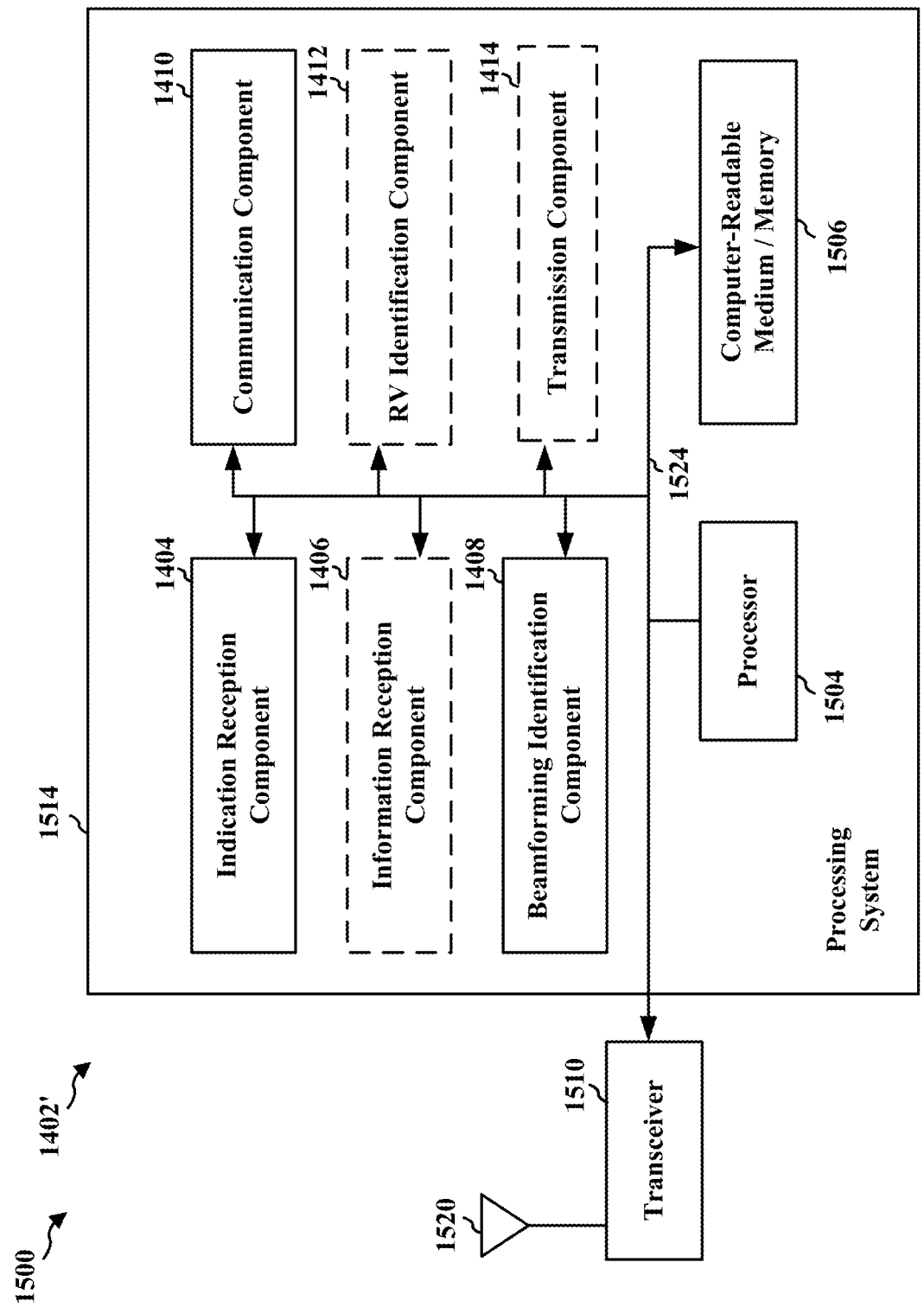
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the indication reception component 1404 and the information reception component 1406. In addition, the transceiver 1510 receives information from the processing system 1514, specifically the transmission component 1414, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, and 1414. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359. Alternatively, the processing system 1514 may be the entire UE (e.g., see 350 in FIG. 3).

In one configuration, the apparatus 1402/1402' for wireless communication includes means for receiving an indication of a beamforming configuration from a base station for communicating using aggregated transmission intervals, wherein the beamforming configuration comprises multiple beamformed channels; means for identifying the beamforming configuration based on the indication; and means for communicating with the base station across the aggregated transmission intervals based on the beamforming configuration. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    transmitting, to a user equipment (UE), a beamforming configuration for communicating with the UE using aggregated transmission intervals, wherein the beamforming configuration indicates allocation of a same transport block in each of the aggregated transmission intervals using different beamformed channels corresponding to different transmission configuration indication (TCI) states, wherein the aggregated transmission intervals comprise aggregated slots or aggregated mini-slots; and
    communicating with the UE across the aggregated transmission intervals based on the beamforming configuration, a transport block.

2. The method of claim 1, wherein the transport block is transmitted or received on a different beamformed channel in each of the aggregated transmission intervals.

3. The method of claim 1, wherein each of the different beamformed channels is mapped to different versions of encoded bits corresponding to a same transport block.

4. The method of claim 1, wherein the beamforming configuration further indicates a plurality of modulation and coding schemes that respectively correspond to the different beamformed channels.

5. The method of claim 1, wherein the communicating comprises communicating a same payload of the transport block in each of the aggregated transmission intervals.

6. The method of claim 5, wherein each of the aggregated transmission intervals comprises a same transport block size.

7. The method of claim 6, wherein the beamforming configuration includes a configuration for each of the aggregated transmission intervals that configures a transport block size for a specified slot of the aggregated transmission intervals.

8. The method of claim 7, wherein the specified slot is selected based on at least one of a modulation and coding scheme of the specified slot and a location of the specified slot within the aggregated transmission intervals, wherein the transport block size for each of the aggregated transmission intervals is based on at least one of the modulation and coding scheme of the specified slot and a number of resource elements in the specified slot.

9. The method of claim 6, wherein the beamforming configuration includes one or more parameters of the aggregated transmission intervals that configures a transport block size.

10. The method of claim 9, wherein the one or more parameters of the aggregated transmission intervals indicate an amount of resource elements in the aggregated transmission intervals.

11. The method of claim 5, wherein the transport block is communicated in each of the aggregated transmission intervals based on a same basic graph.

12. The method of claim 1, wherein the beamforming configuration further indicates information to the UE that prompts the UE to select a spatial filter for communicating on one of the different beamformed channels.

13. The method of claim 1, wherein the beamforming configuration further indicates a redundancy version (RV) for each of the aggregated transmission intervals, wherein the aggregated transmission intervals are mapped to different RVs of an RV sequence in a circular buffer.

14. The method of claim 13, wherein the beamforming configuration comprises a first signaling indicating a list of candidate RV sequences and a second signaling indicating one candidate from among the list of candidate RV sequences, wherein the RV for each of the aggregated transmission intervals indicates an RV for a respective slot, and wherein each of the aggregated transmission intervals start at a location on a circular buffer based on a corresponding location at which a prior slot ends.

15. A method of wireless communication at a user equipment (UE), comprising:
    receiving, from a base station, a beamforming configuration for communicating with the base station using aggregated transmission intervals, wherein the beamforming configuration indicates allocation of a same transport block in each of the aggregated transmission intervals using different beamformed channels corresponding to different transmission configuration indication (TCI) states, wherein the aggregated transmission intervals comprise aggregated slots or aggregated mini-slots; and
    communicating, with the base station across the aggregated transmission intervals based on the beamforming configuration, a transport block.

16. The method of claim 15, wherein the transport block is received or transmitted on a different beamformed channel in each of the aggregated transmission intervals.

17. The method of claim 15, wherein each of the different beamformed channels is mapped to different versions of encoded bits corresponding to a same transport block.

18. The method of claim 15, wherein the beamforming configuration further indicates a plurality of modulation and coding schemes that respectively correspond to the different beamformed channels.

19. The method of claim 15, wherein the communicating comprises communicating a same payload of the transport block in each of the aggregated transmission intervals.

20. The method of claim 19, wherein the transport block is communicated in each of the aggregated transmission intervals based on a same basic graph.

21. The method of claim 19, wherein each of the aggregated transmission intervals comprises a same transport block size.

22. The method of claim 21, wherein the beamforming configuration includes a configuration for each of the aggregated transmission intervals that configures a transport block size for a specified slot of the aggregated transmission intervals.

23. The method of claim 22, wherein the specified slot is selected based on at least one of a modulation and coding scheme of the specified slot and a location of the specified slot within the aggregated transmission intervals, wherein the transport block size for each of the aggregated transmission intervals is based on at least one of the modulation and coding scheme of the specified slot and a number of resource elements in the specified slot.

24. The method of claim 21, wherein the beamforming configuration includes one or more parameters of the aggregated transmission intervals that configures a transport block size.

25. The method of claim 24, wherein the one or more parameters of the aggregated transmission intervals indicate an amount of resource elements in the aggregated transmission intervals.

26. The method of claim 15, wherein the beamforming configuration further indicates information to the UE that prompts the UE to select a spatial filter for communicating on one of the different beamformed channels.

27. The method of claim 15, wherein the beamforming configuration further indicates a redundancy version (RV) for each of the aggregated transmission intervals, wherein the aggregated transmission intervals are mapped to different RVs of an RV sequence in a circular buffer.

28. The method of claim 27, wherein the beamforming configuration comprises a first signal indicating a list of candidate RV sequences and a second signal indicating one candidate from among the list of candidate RV sequences, wherein the RV for each of the aggregated transmission intervals indicates an RV for a respective slot, and wherein each of the aggregated transmission intervals start at a location on a circular buffer based on a corresponding location at which a prior slot ends.

29. An apparatus for wireless communication at a base station, comprising:
a memory; and
at least one processor coupled to the memory and configured to:
transmit, to a user equipment (UE), a beamforming configuration for communicating with the UE using aggregated transmission intervals, wherein the beamforming configuration indicates allocation of a same transport block in each of the aggregated transmission intervals using different beamformed channels corresponding to different transmission configuration indication (TCI) states, wherein the aggregated transmission intervals comprise aggregated slots or aggregated mini-slots; and
communicate, with the UE across the aggregated transmission intervals based on the beamforming configuration, a transport block.

30. An apparatus for wireless communication at a user equipment (UE), comprising:
a memory; and
at least one processor coupled to the memory and configured to:
receive, from a base station, a beamforming configuration for communicating with the base station using aggregated transmission intervals, wherein the beamforming configuration indicates allocation of a same transport block in each of the aggregated transmission intervals using different beamformed channels corresponding to different transmission configuration indication (TCI) states, wherein the aggregated transmission intervals comprise aggregated slots or aggregated mini-slots; and
communicate, with the base station across the aggregated transmission intervals based on the beamforming configuration, a transport block.

* * * * *